(12) United States Patent
Brown

(10) Patent No.: US 11,011,894 B2
(45) Date of Patent: May 18, 2021

(54) HVDC MODULAR PLATFORM DESIGN

(71) Applicant: J. Ray McDermott, S.A., Houston, TX (US)

(72) Inventor: Brian K. Brown, Newbury (GB)

(73) Assignee: J. Ray McDermott, S.A., Houston, TX (US)

( * ) Notice: Subject to any disclaimer, the term of this patent is extended or adjusted under 35 U.S.C. 154(b) by 87 days.

(21) Appl. No.: 15/988,567

(22) Filed: May 24, 2018

(65) Prior Publication Data

US 2018/0342856 A1 Nov. 29, 2018

Related U.S. Application Data

(60) Provisional application No. 62/510,426, filed on May 24, 2017.

(51) Int. Cl.
| | | |
|---|---|---|
| *H02B 5/00* | (2006.01) | |
| *H02M 7/00* | (2006.01) | |
| *F03D 13/25* | (2016.01) | |
| *H02B 1/46* | (2006.01) | |
| *H02B 3/00* | (2006.01) | |
| *H02J 3/36* | (2006.01) | |
| *H02J 3/38* | (2006.01) | |
| *H02M 7/757* | (2006.01) | |
| *E02D 29/09* | (2006.01) | |

(52) U.S. Cl.
CPC ............... *H02B 5/00* (2013.01); *F03D 13/25* (2016.05); *H02B 1/46* (2013.01); *H02B 3/00* (2013.01); *H02J 3/36* (2013.01); *H02J 3/386* (2013.01); *H02M 7/003* (2013.01); *E02D 29/06* (2013.01); *F05B 2220/7064* (2013.01); *F05B 2240/95* (2013.01); *H02M 7/7575* (2013.01)

(58) Field of Classification Search
CPC ........................................................ H02B 7/01
See application file for complete search history.

(56) References Cited

U.S. PATENT DOCUMENTS

2013/0277438 A1* 10/2013 Terwiesch .............. G05D 16/20
236/1 E

FOREIGN PATENT DOCUMENTS

CN 104320006 A 1/2015

OTHER PUBLICATIONS

International Search Report and Written Opinion dated Sep. 3, 2018 for Application No. PCT/US2018/034420.

(Continued)

*Primary Examiner* — Daniel Kessie
(74) *Attorney, Agent, or Firm* — Patterson + Sheridan, LLP

(57) ABSTRACT

A modular HVDC platform and a method for constructing the same are disclosed herein. The modular HVDC platform has a topside disposed on a structural jacket. The topside includes a first rectifier module, a second rectifier module, and a utility module. The first and second rectifier modules have equipment for converting AC power to DC power disposed therein. The utility module contains equipment for supporting the operations of the rectifier modules. Each of the rectifier modules and the utility modules can be fabricated and commissioned onshore prior to installation on the structural jacket at an offshore location.

10 Claims, 5 Drawing Sheets

(56) References Cited

OTHER PUBLICATIONS

M. Davies et al: "HVDC PLUS—Basics and Principle of Operation Table of Contents", Aug. 10, 2008, URL:http://www.energy.siemens.com/mx/pool/hq/power-transmission/HVDC/HVDC_Plus_Basic and Principals.pdf.

De Alegria I. M. et al: "Transmission alternatives for offshore electrical power", Renewable and Sustainable Energy Reviews, Elseviers Science, New York, NY, US, vol. 13, No. 5, Jun. 1, 2009, pp. 1027-1038.

"Differential Signaling", Wikipedia, Page indicated as last edited on Dec. 26, 2019, pp. 1-5, https://en.wikipedia.org/wiki/Differential_signaling (last accessed Jan. 29, 2020).

Carsten Pinkle, "The Why and How of Differential Signaling", All About Circuits, Nov. 26, 2016, pp. 1-8, https://www.allaboutcircuits.com/technical-articles/the-why-and-how-of-differential-signaling/ (last accessed Jan. 29, 2020).

European Office Action dated Sep. 9, 2020 for Application No. 18730920.8.

\* cited by examiner

HVDC MODULAR PLATFORM DESIGN

CROSS-REFERENCE TO RELATED APPLICATIONS

This application claims benefit of U.S. provisional patent application Ser. No. 62/510,426, filed May 24, 2017, which is herein incorporated by reference.

BACKGROUND

Field

Embodiments of the present disclosure generally relate to offshore platforms for wind energy generation. More specifically, the disclosure relates to a modular HVDC platform for converting AC power to DC power.

Description of the Related Art

The rapid growth of the wind power generation industry has resulted in the development of large wind turbines grouped in clusters that can generate large amounts of power. These large wind turbines are commonly installed far from shore at offshore locations which presents many challenges for transmitting the generated power back onshore. Wind turbines produce power in alternating current (AC). AC power has large losses in power over long transmission distances. Thus, AC power installations are generally installed close to shore to minimize the losses, or supplemented by installing costly "boosting stations" to transmit the generated AC power over long distances. In order to overcome the losses that exist in AC power transmission and reduce the size of the transmitting cables, the industry has moved to grouping the wind farm power into larger power generating sites, typically 900 MW, and then converting the power to Direct Current (DC). DC power does not exhibit the power losses associated with AC power over long transmission distances. DC power is used to transmit the power to a land-based inverter station where the DC power is converted back to AC power for incorporation in a distribution system.

Due to the large generating capacity associated with current wind generation facilities, the conversion equipment needed by the HVDC requires a large footprint. For example, the converting equipment dissipates a large amount of heat directly to the ambient air so a large system is needed to handle the heat loads. Also, the high voltages of conversion equipment have a potential to arc from one location to another within the HVDC platform, so sufficient distance between components and inert atmospheres are required to prevent such arcing. Such space requirements and weight of the associated equipment has led to increasingly large and heavy topsides of the converting platforms, typically in excess of 20,000 metric tons, far exceeding those used in oil and gas platforms. Still further, the design and construction of such platforms has proved problematic and prohibitively expensive.

Therefore, there is a need for an improved HVDC platform design.

SUMMARY

The present disclosure generally relates to offshore platforms for wind energy generation. More specifically, the disclosure relates to a modular HVDC platform for converting AC power to DC power.

In one aspect, an offshore platform for power generation comprises a structural jacket, a utility module disposed on the structural jacket, the utility module disposed in a first housing, and one or more rectifier modules disposed on the structural jacket adjacent to the utility module. Each of the one or more rectifier modules is disposed in a respective second housing, and each rectifier module comprises equipment for converting AC power to DC power.

In another aspect, a system for wind energy generation comprises an offshore platform comprising a structural jacket and a topside, wherein the topside comprises a plurality of modular sections position on a module support frame. The system also includes a first plurality of rectifiers disposed in a first module of the plurality of modular sections, the first module positioned within a first housing; and a second plurality of rectifiers disposed in a second module of the plurality of modular sections, the second module positioned within a second housing. The system also includes a third module of the plurality of the modular sections, wherein the third module is a utility module configured to support the operations of the first module and the second module, the third module positioned within a third housing.

In another aspect, a method of constructing an offshore platform comprises installing a substructure at an offshore location, installing a module support frame on the substructure, and installing a first module of a topside on the module support frame. The first module comprises pre-installed equipment for converting AC power to DC power. The method also includes installing a second module of the topside on the module support frame, the second module comprising pre-installed equipment for converting AC power to DC power, and coupling the first module and the second module.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to a modular HVDC platform and a method of constructing the same. The modular HVDC platform has a topside disposed on a structural jacket. The topside includes a first rectifier module, a second rectifier module, and a utility module. The first and second rectifier modules have equipment for converting AC power to DC power disposed therein. The utility module contains equipment for supporting the operations of the rectifier modules. Each of the rectifier modules and the utility modules can be fabricated and commissioned onshore prior to installation on the structural jacket at an offshore location.

Figure 1:
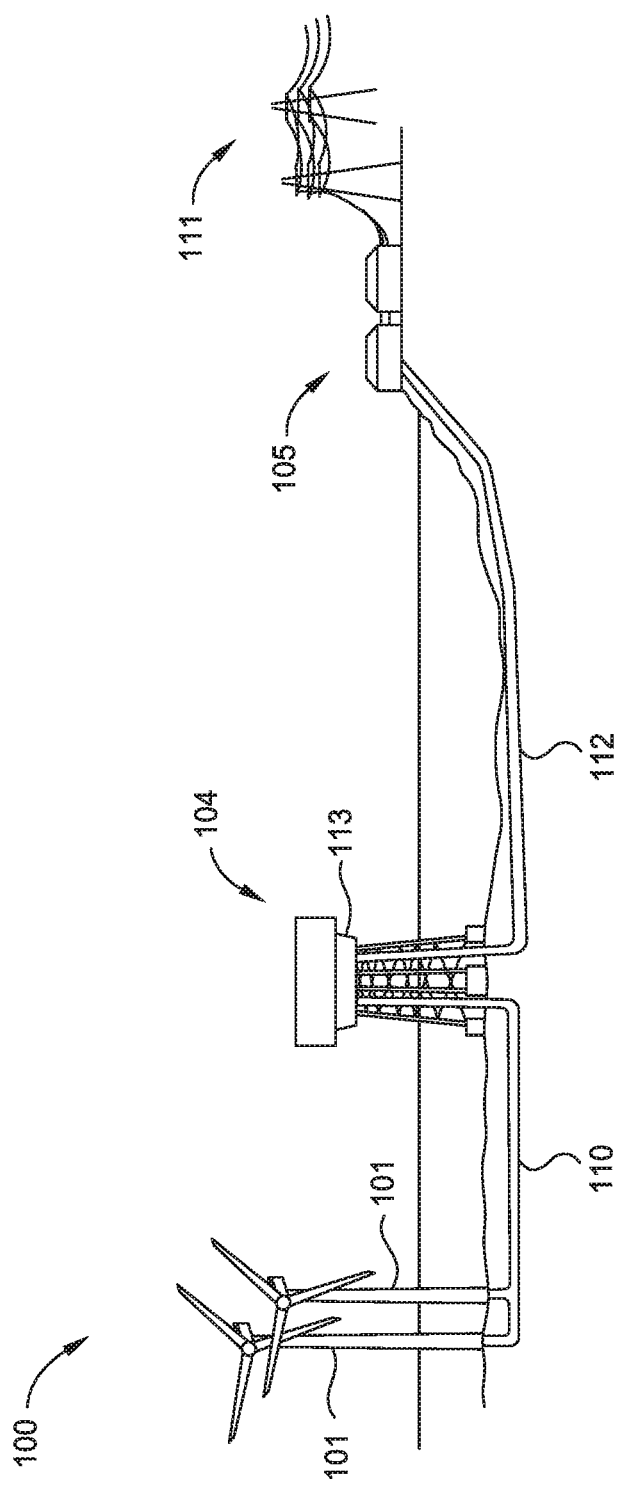
FIG. 1 is an illustration of an exemplary offshore wind generation site.

FIG. 1 is an example of a wind generating facility 100 at an offshore location. The wind generating facility 100 includes a cluster of wind turbines 101 installed on foundations at an offshore location. The wind turbines 101 produce AC power which is transmitted along a line 110. An AC-to-DC convertor is near the wind turbines 101 in order convert the AC power into high voltage direct current (HVDC) for transmission to shore. The converter is a modular HVDC platform 104 which contains necessary equipment to convert the AC to HVDC for transmission to shore via a transmission line 112. The HVDC line is supported on an optional module support frame 113. The transmission line 112 may cover a great length, such as tens or hundreds of miles, before reaching shore. The HVDC is converted again to AC at an inverting station 105 where it is distributed into the distribution system 111 for consumption.

Figure 2:
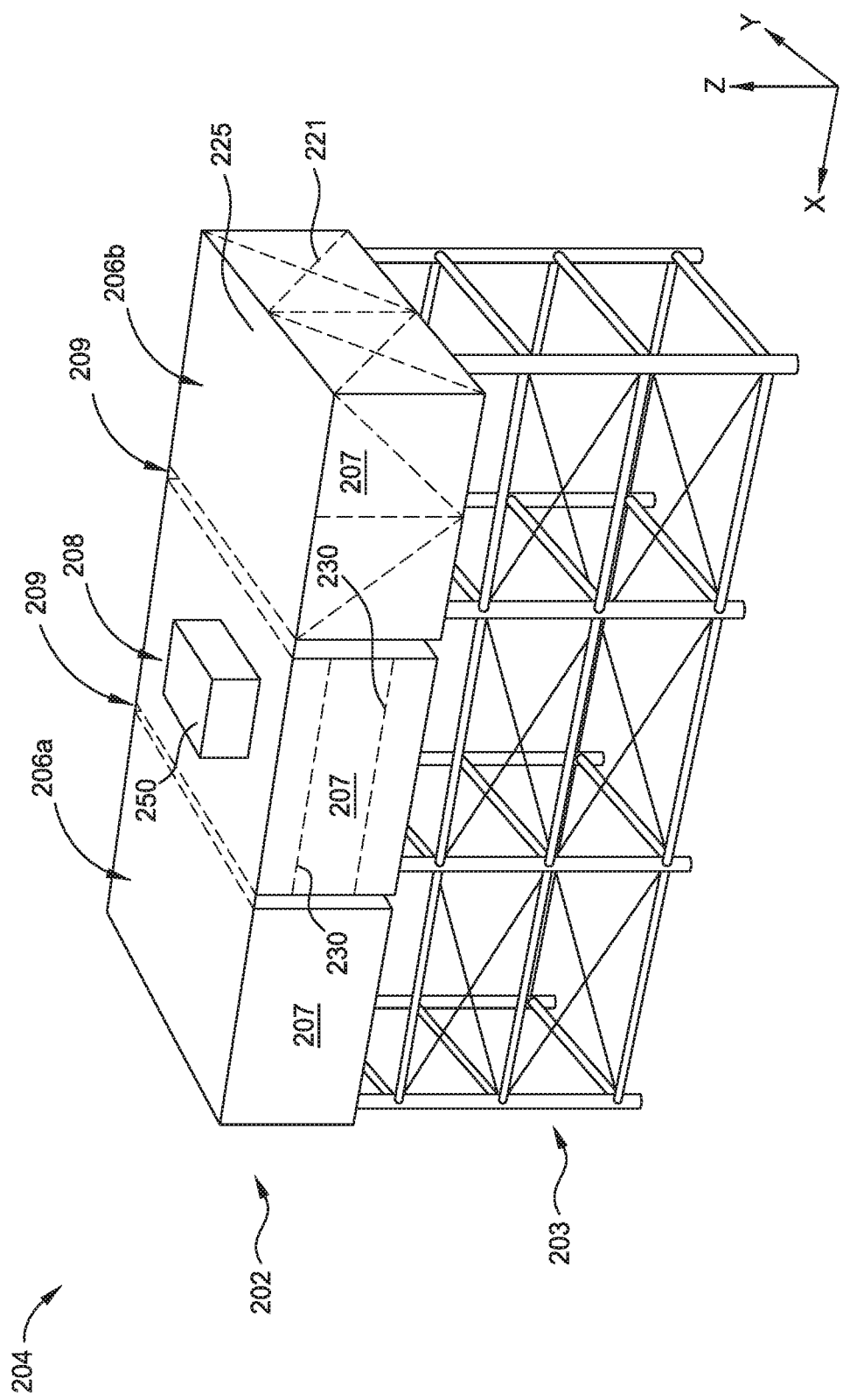
FIG. 2 is an isometric view an exemplary modular HVDC platform according to one embodiment.

FIG. 2 is an isometric view of a modular HVDC platform 204 according to one embodiment. The modular HVDC platform 204 may be used in place of the modular HVDC platform 104 shown in FIG. 1. The modular HVDC platform 204 has a structural jacket 203 supporting a topside 202. The structural jacket 203 is a designed structure which is installed at the platform site separately from the topside 202. Here, the structural jacket 203 is a pile system which is mounted on the seafloor. However, it is also contemplated that other designs of the structural jacket 203, such as compliant towers, concrete gravity structures, jack-up vessels, or even floating structures can be utilized with the embodiments described herein. The structural jacket 203 provides adequate support for the topside 202 and the associated HVDC equipment described below. The jacket 203 may be secured using hammered or drilled piles, or other securing devices. It is contemplated that the use of drilled piles reduces the total number of piles necessary for securing the jacket due to the greater depth in to which drilled piles are disposed, compared to hammered piles. Moreover, drilled piles obviate the need for bubble curtains (and studies associated therewith), further reducing costs while also mitigating high noise levels typically associated with hammered piles.

The topside 202 is formed from three modular sections including rectifier modules 206a, 206b, and a utility module 208. The rectifier modules 206a, 206b are positioned at opposite ends of the structural jacket 203 with the utility module 208 disposed therebetween. Connections and couplings, such as electrical cables, hoses, optical fibers, and the like, are disposed therebetween to facilitate electrical, fluid, or other connections between the rectifier modules 206a, 206b, and the utility module 208. In one example, the rectifier modules 206a, 206b are identical to one another. In another example, the rectifier modules 206a, 206b mirror one another.

Each rectifier module 206a, 206b includes equipment to support conversion of AC power to DC power. Exemplary equipment includes rectifiers, reactors, switch gear, monitoring equipment, safety equipment (such as fire protection), and cooling systems, among others. Each rectifier module 206a, 206b is configured to convert the positive node or the negative node of the AC power. Therefore, a module for converting both positive and negative nodes is provided. The illustrated configuration (e.g., the utility module 208 positioned between the rectifier modules 206a, 206b) reduces the length of couplings between the utility module 208 and each of the rectifier modules 206a, 206b. However, it is contemplated that other configurations, such as positioning the rectifier modules 206a, 206b adjacent one another, may also be utilized.

Each rectifier module 206a, 206b includes a housing 207 in which the equipment is housed. Each housing 207 is formed from stressed steel skin, such as corrugated stainless steel, or another alloy, which results in increased rigidity and reduced weight of each housing 207. The stressed steel skin results in a weight reduction of about 15 percent over the architectural cladding of conventional structures. Optional corrugation of the skin imparts additional rigidity. Each housing 207 may also include a frame 221 (shown partially, in phantom) or other structure to facilitate support of the stressed steel skin on outward surfaces of the frame 221. Although only rectifier module 206b is shown with a frame 221, it is to be understood that the housings 207 of the rectifier module 206a and the utility module 208 may also have frames 221.

Each housing 207 includes four sidewalls and optionally a roof. Each respective housing 207 allows the rectifier modules 206a, 206b and the utility module 208 to be constructed independently, while the equipment therein remains protected, for example, while stored at a facility. Thus, the rectifier modules 206a, 206b and the utility module 208 can be constructed and commissioned independently at separate locations or a separate times, facilitating inexpensive construction. For example, aspects herein may lead to a reduction in capital expenditure of about 10 percent compared to conventional topsides having equivalent operating performance. Moreover, since the rectifier modules 206a, 206b and the utility module 208 can be constructed and stored, such modules may be pre-fabricated prior to commissioning of a HVDC platform, thereby reducing the construction time for a HVDC platforms.

The housings 207 also facilitate a controlled environment which may be more easily temperature-controlled, as compared to conventional designs. The relatively small volume within each housing 207 is more easily maintained within a desired operating temperature range by heating/cooling equipment. Therefore, equipment within each housing 207 can be positioned in closer proximity without overheating, thus reducing the volume of each housing 207. In contrast, in conventional designs, such as those employing a single, non-modular topside, temperature control is more challenging. Thus, in conventional designs, operating equipment is spaced further apart compared to aspects disclosed herein in order to mitigate the likelihood of adjacent components overheating due to radiating energy of the adjacent components.

The utility module 208 is disposed between, and coupled to (electrically and/or physically), the rectifier modules 206a, 206b. In one example, a gap or walkway 209 is positioned between the utility module 208 and each rectifier module 206a, 206b to facilitate access therebetween. The walkway 209 may have a width in within a range of two meters to about three meters, although other widths are also contemplated. The utility module 208 also includes a housing 207 and contains equipment therein to support the HVDC conversion operations of the rectifier modules 206a, 206b as well as electrical systems for transmitting power. The utility module 208 also functions as the incoming/ outgoing cable termination and distribution connection for the modular HVDC platform 204. Exemplary equipment used in the utility module 208 includes AC transformers, reactors, switchgear (such as for 400 KV, 155 KV, 10 KV, 400V, and 220V), seawater lift systems, cooling heat exchangers, control room and associated control systems, fire monitoring and protection equipment, and emergency generators, among others.

In one example, the utility module 208 is configured to support one or more auxiliary units 250 on an upper surface 225 (e.g., roof) of the respective housing 207. The one or more auxiliary units 250 include additional equipment or storage. For example, the one or more auxiliary units 250 may include an emergency generator, generator switchgear, a garbage room or other garbage storage, hazardous material storage, and/or one or more cranes. In one example, two cranes are positioned at opposing corners of the upper surface 225. Positioning the auxiliary units 250 on the utility module 208 facilitates even weight distribution and efficient floor space usage amongst the topside 250. While the roof 225 is shown as a continuous roof across all modules, it is contemplated that each module may include a separate roof discontinuous from roofs of other modules (such that walkways 209 are exposed or partially exposed). Alternatively, each module may include a distinct, respective sub-roof under the upper surface 225.

In some examples, the utility module 208 and the rectifier modules 206a, 206b may each include therein a plurality of sublevels 230 (two are shown in the utility module 208) to facilitate equipment placement, maintenance, and the like. In a specific example, the utility module 208 includes a plurality of sublevels 230 therein, such as two sublevels 230, while each of the rectifier modules 206a, 206b includes a single sublevel 230. In such an example, the sublevels 230 of the utility module 208 have a length (y-direction) and width (x-direction) spanning the interior volume of a respective housing 207. The sublevels 230 of the rectifier modules 206a, 206b have a width spanning a respective housing 207 interior width, but a length less than a respective housing 207 length, such as a length of about 40 percent to about 60 percent of a length of the respective housing 207. A continuous roof structure may be positioned over each of the utility module 208 and the rectifier modules 206a, 206b to facilitate protection from the elements. In such an example, it is contemplated that the continuous roof structure is formed from a plurality of adjoining panels, and overhangs or is aligned with the perimeter of the topside 202.

In one example, the utility module 208 may have a weight within a range of about 5500 MT to about 7500 MT, such as about 7100 MT. Each rectifier module 206a, 206b may have a weight within a range of about 3200 MT to about 5000 MT, such as about 4100 MT. In one example, including a modular support and connections and couplings between the utility module 208 and the rectifier modules 206a, 206b, the topside 202 has a weight within a range of about 14,500 MT to about 15,500 MT, providing a significant weight savings over conventional topsides. In one example, the weight of the topside 202 is about 15 percent to about 30 percent less than conventional topsides, having equal operational performance. Moreover, the reduction in weight of the topside 202 compared to conventional topsides increases the availability of vessels for transporting the topside 202 to the structural jacket 203, because more vessels having the lifting capacity for transporting/positioning the topside 202 become available due to the reduced weight. By arranging the HVDC equipment into the utility module 208 and the rectifier modules 206a, 206b, the ability to control the temperature of equipment is improved. Thus, reduced layouts can be utilized, compared to conventional topsides, resulting in weight savings over previous approaches.

Figure 3:
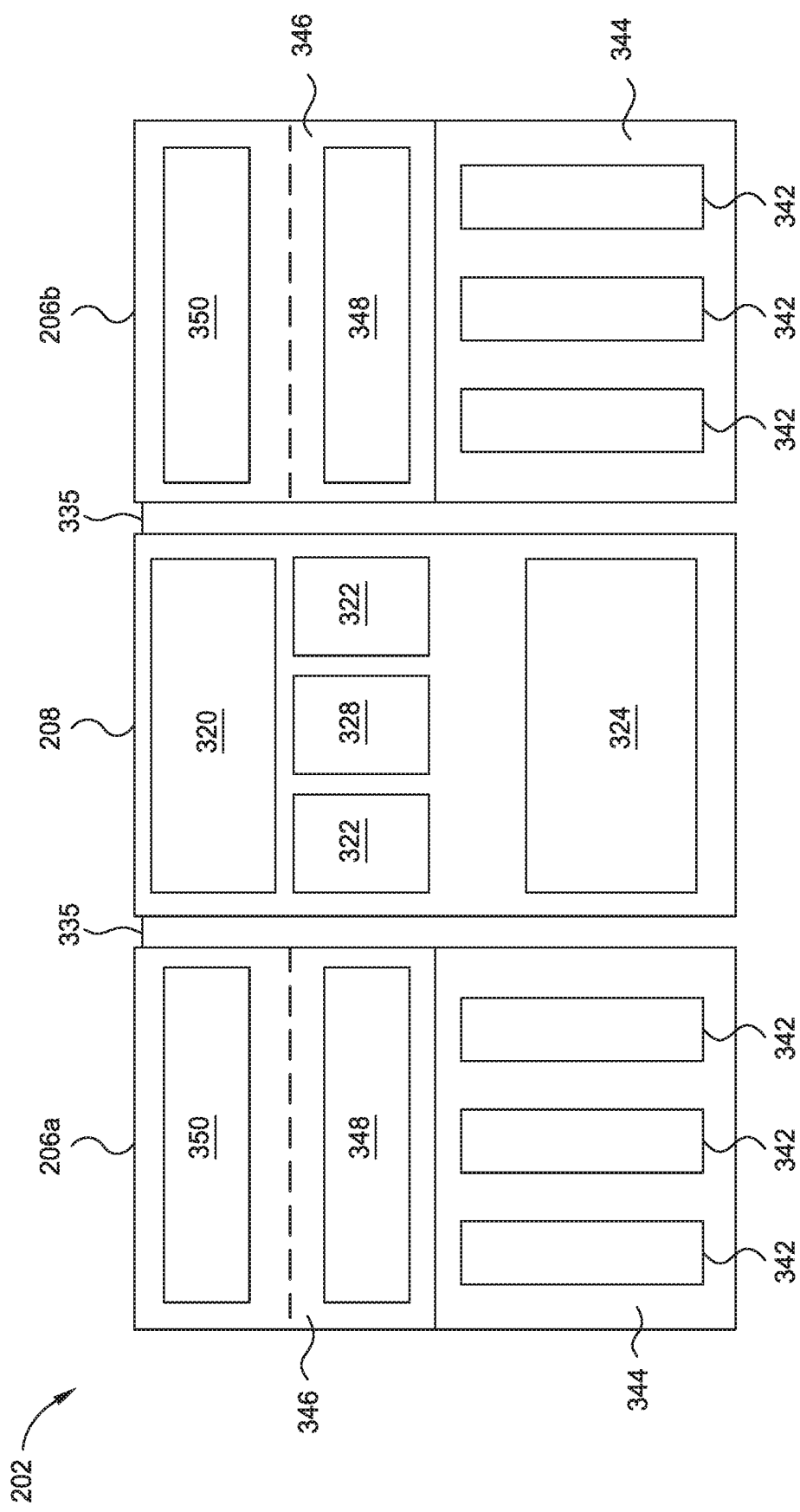
FIG. 3 is a plan view of an exemplary modular HVDC platform according to one embodiment.

FIG. 3 is a schematic arrangement, in plan, of the topside 202 of the modular HVDC platform 204 (shown in FIG. 2). Each rectifier module 206a, 206b has a rectifier hall 344 and a reactor hall 346. Rectifiers 342 are disposed within the rectifier halls 344. Here, three rectifiers 342 are representatively shown in each rectifier hall 344. However, other suitable numbers of rectifiers 342 suitable for converting the AC power to DC power may be used in relation to the generating capacity of the site. Adjacent to the rectifier halls 344 are reactor halls 346. The reactor halls 346 contain reactors 348 therein. The reactors 348 are, for example, smoothing reactors, filter reactors, or other suitable filters for HVDC operations.

A utility block 350 is also disposed with the rectifier modules 206a, 206b. The utility blocks 350 each include one or more utility systems, such as heating and cooling systems, fire monitoring and protection system, as well as the control room and control systems, among other components, that are associated with supporting the operation of the rectifiers 342 and the reactors 348. In one example, each rectifier module 206a, 206b includes a respective control system in a utility block 350. Thus, each rectifier module 206a, 206b can be fabricated and tested prior to installation and commissioning, even at different locations. The ability to fabricate and test the rectifier modules 206a, 206b individually increases the number of fabrication site options, allowing lower cost construction and faster schedules to be obtained.

In one example, the reactor hall 346 is positioned on a level above the utility block 350. In such an example, space usage within the rectifier modules 206a, 206b is optimized, and the volumes thereof minimized. Further, the reactor hall 346 is positioned laterally from the rectifier hall 344. Lateral placement of the reactor hall 346 relative to the rectifier hall 344 results in a reduced height (and a corresponding reduced volume) of the rectifier modules 206a, 206b. Moreover, the reduced height (z-direction, FIG. 2) of the rectifier modules 206a, 206b results in reduced structural components (such as framing material and skins of a respective housing), thereby resulting in further reductions of weight and cost of the topside 202. Conventionally, reactor halls and rectifier halls are positioned vertically over one another to reduce the topside footprint. However, it has been surprisingly discovered that weight savings attributable to horizontal placement of the reactor hall 346 relative to the rectifier hall 344 (facilitated, in part, by increased temperature control capacity of each rectifier module 206a, 206b due to the reduced volume therein) results in greater weight reduction than vertical placement of the reactor hall 346 relative to the rectifier hall 344. In such an example, the reactor 348 of the reactor hall 346 may be positioned coplanar (e.g., horizontal) with respect to the rectifiers 342 of the rectifier hall 344.

The utility module 208 is coupled to the rectifier modules 206a, 206b by one or more connecting members 335. The connecting members include one or more electrical, fluid, or mechanical connections, including wiring, piping, fiber optics, and the like. The utility module 208 contains equipment for supporting the operations of the rectifier modules 206a, 206b. A cable termination 320 is disposed within the utility module 208. The cable termination 320 functions as the entry and exit location for the cables for transmitting the generated power from the turbines. A first plurality cables provide the AC power from the turbines to the topside 202. After conversion from AC power to DC power, a second plurality of cables transmits the DC power from the topside 202 to a destination, such as a land-based invertor station, for joining into the distribution network.

The utility module 208 also contains transformers 322. The transformers can be AC and/or DC transformers for increasing and/or decreasing voltage as needed. Switchgear 328 is utilized in the utility module 208. The switchgear 328 represents systems, relays, and disconnects for both AC power and DC power to control the flow of each. The utility module 208 also contains a utility block 324. The utility block 324 represents the utility systems for supporting the utility module 208 and the rectifier modules 206a, 206b. The utility block 324 includes one or more of panels and control systems for the HVDC system, cooling and heating systems, sea water pumping systems, water circulation systems, fire monitoring and protection systems, control rooms, maintenance workshops, and storage space, among other components.

Figure 4:
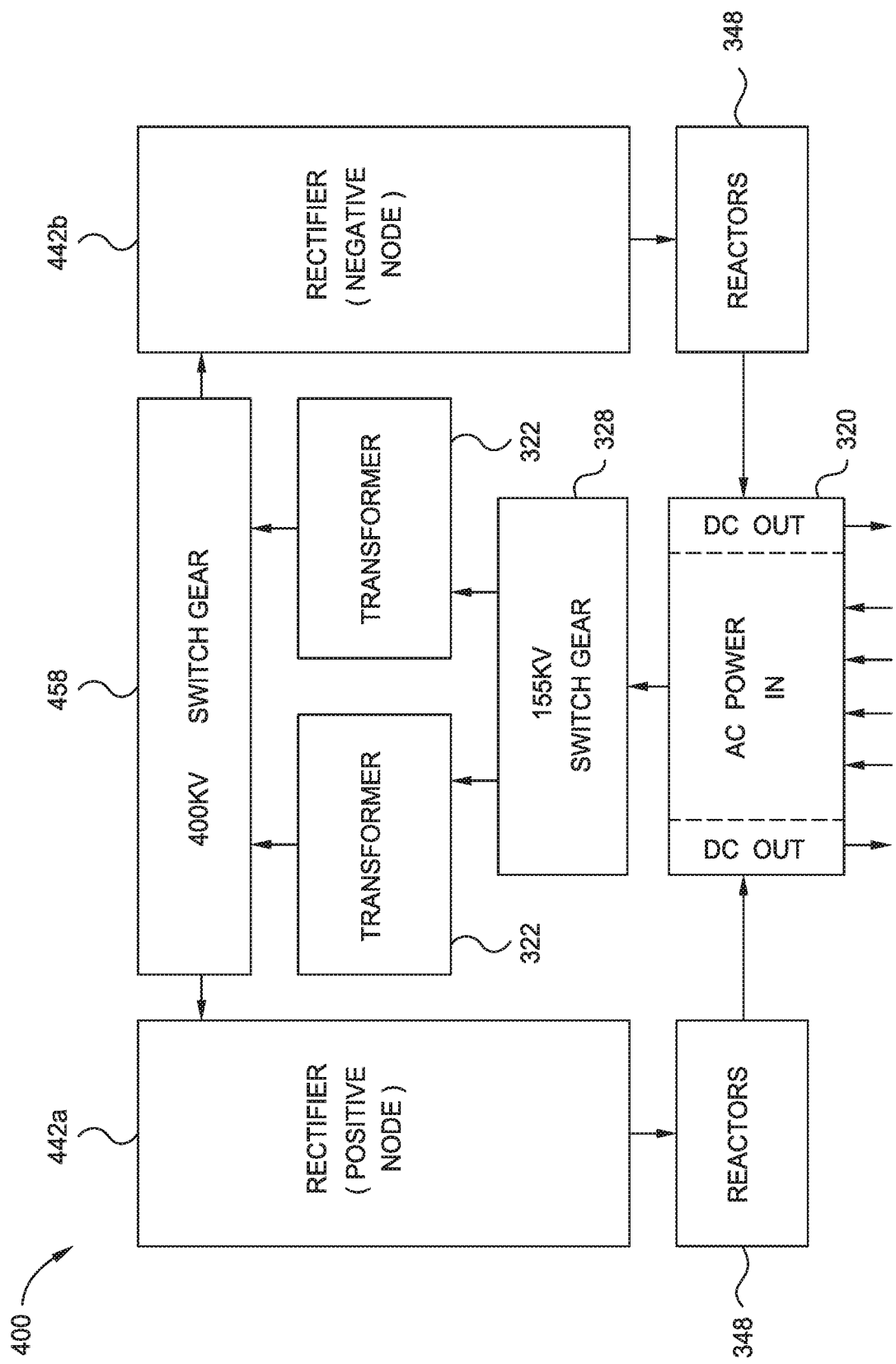
FIG. 4 is a schematic energy flow of an HVDC system according to one embodiment.

FIG. 4 is a block diagram representing current flow through an HVDC system 400 of the modular HVDC platform 204. The block diagram begins at a cable termination 320. AC power enters the modular HVDC platform 204 at the cable termination 320 and flows to the 155 KV switchgear 328. From the 155 KV switchgear 328, the AC power is split between two blocks of transformers 322 which step the voltage up to 400 KV. The AC power then flows to the 400 KV switchgear 458 before being directed to rectifier banks. A first rectifier bank 442a corresponds to the positive node of the AC power. A second rectifier bank 442b corresponds to the negative node of the AC power. The AC power is converted to DC power in the rectifier banks 442a, 442b.

After conversion, the DC power flows through a series of reactors 348. The reactors 348 are, for example, smoothing reactors which reduce the harmonics generated by the cyclic current of the AC power. After the reactors 348, the DC power returns to the cable termination 320. The DC power exits the modular HVDC platform 204 at the cable termination 320 through transmission cables to be transmitted to land for use in a distribution network. The cable termination 320 serves as a common entry and exit point for the AC power and DC power. However, the cable termination 320 is divided so that the AC power and the DC power do not come into contact. Alternatively, it is contemplated distinct entry and exits points may be utilized to further reduce the likelihood of generating an electrical short. While FIG. 4 is described with respect to example voltages, it is contemplated that aspects herein may be utilized with other voltages.

By utilizing the HVDC system 400, the size and weight of the topside 202 of the modular HVDC platform 204 can be significantly reduced, such as to a weight of about 14,500 to 16,000 metric tons. Conventional HVDC systems utilize reactors positioned directly below rectifiers. However, the disclosure herein utilizes reactors in line (e.g., coplanar) with rectifiers and positioned laterally/horizontally therefrom. Therefore, the vertical space needed for housing the reactor halls and the rectifier halls is significantly reduced. Additionally, aspects disclosed herein utilize modular construction. That is, the rectifier modules 206a, 206b and the utility module 208 are constructed and commissioned as separate modules. For example, the rectifier modules 206a, 206b can be fabricated and fitted with most or all the HVDC equipment and control systems at a land-based yard. The equipment within the rectifier modules 206a, 206b can be pre-installed and tested prior to transportation of the module to the location of, and installation on, the structural jacket 203. The same is also done for the utility module 208.

Upon installation of the rectifier modules 206a, 206b and the utility module 208 onto the structural jacket 203, any remaining connections, such as fluid and adjoining electrical tie-ins, are made at the installation site. Thus, the construction costs are significantly reduced since pre-fabrication and commissioning can be done on land at location and using techniques that are more cost effective than conventional at-sea techniques. Further, the smaller size and weight of the rectifier modules 206a, 206b and the utility module 208 allow for smaller and more readily available cranes for installation thereof onto the structural jacket 203.

Figure 5:
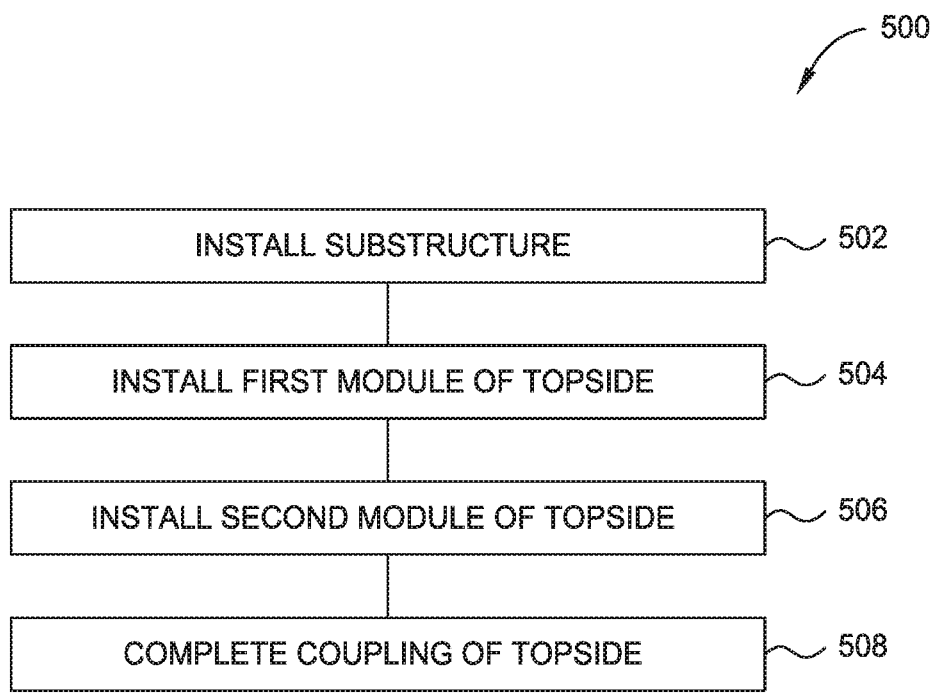
FIG. 5 is a flowchart of a method of constructing a platform according to one embodiment.

FIG. 5 is a flowchart of a method 500 of constructing an HVDC platform. The method 500 begins at operation 502. In operation 502, a substructure is installed. The substructure is, for example, the structural jacket 203 of FIG. 2. In one example, the substructure can be fabricated at a yard and transported to the installation site such as by a heavy lift vessel (HLV). In another example, the substructure is fabricated and installed onsite. The substructure may have an optional module support frame 113 (shown in FIG. 1) positioned thereon. The module support frame facilitates support and alignment of modules positioned thereon. The optional module support frame may be coupled to the substructure prior to transport to an offshore location, or may be coupled to the substructure at an offshore location. The module support frame may include one or more tracks, receptacles, couplings, and the like for securing and aligning modules thereto. In one example, the module support structure is a metal frame formed, for example, from I-beams. In another example, the module support structure is a truss structure. In yet another example, the module support structure is a deck including frame and an optional covering layer.

At operation 504, a first module is installed on the substructure, and in particular, on the module support frame, if present. The module may be, for example, the utility module 208 or one of the rectifier modules 206a, 206b. In one example, the first module is fabricated and pre-commissioned at a fabrication yard. The first module is then transported to a location of the substructure and installed thereon. In another embodiment, the first module is fabricated at a first yard, transported to a second yard for installation of equipment, commissioning, and/or testing, and then transported to the site of the substructure for installation. A crane may be used to position the first module on the substructure, at either a central position or a laterally-outward position on the substructure. One or more alignment features may be include on the first module and/or the substructure (or optionally, the modular support frame) to facilitate alignment or support when positioning the first module over the substructure. In one example, the alignment features include a plurality of male/female adapters.

At operation 506, a second module used is installed on the substructure, and in particular, is installed on the module support frame, if present. The second module may be similar to the first module or a different module type, and may be installed in similar manner to the first module. The installation of the second module may be repeated as needed to install one or more additional second modules to form the topside. In one example, the operation 506 is repeated one additional time, resulting in three total modules positioned on the substrate structure. While embodiments herein describe placement of three modules on a substructure, it is contemplated that installation may include more than three modules positioned on the substructure. It is contemplated that the second module may be transported to the structural jacket location at a different time or on a different vessel than the first module. Additionally, it is contemplated that the first module and the second module may be transported to a location of the structural jacket on the same vessel, size permitting.

At operation 508, the coupling of the topside, including the adjoining of modules together and to the substructure, is completed. For example, connections between the first and second modules, such as cooling systems, electrical connections, control systems, and the like, are made. Any remaining commissioning tasks are also completed at this time.

While embodiments herein describe topsides including a single module support frame and three modules disposed therein, other configurations are also contemplated. For example, it is contemplated that topsides disclosed herein may be scaled to handle greater power requirements, or for distribution to different locations. In one example, a topside includes multiple utility modules, and two or more rectifier modules per utility module. In another example, a substructure, such as jacket 203, supports a plurality of module support frames, such as module support frame 113, shown in FIG. 1. In such an example, each module support frame supports at least one utility module and at least one or more rectifier modules. In yet another example, it is contemplated that a plurality of HVDC modular platforms may be arranged adjacent one another, and may be operatively coupled. Such an arrangement facilitates ease of maintenance on the HVDC modular platforms due to the relatively close proximity therebetween.

The embodiments herein advantageously provide a modular HVDC platform and a method for constructing the same. By utilizing the modular design, the overall size and weight of the HVDC platform is significantly reduced. The reduced size and weight of the modular units allows for jacket of reduced size to be utilized, further reducing capital expenditure. Costs of construction for the modular units are also significantly reduced by the embodiments described herein. The modular design allows for fabrication and pre-commissioning of significant portions of the HVDC system to be completed in a fabrication yard prior to transportation of a module to an install site. Additionally, the crane size and capacity used to install the topside onto a substructure and to perform maintenance on the HVDC system is greatly reduced. Therefore, less expensive and more readily available lifting vessels can be used to construct and maintain the modular HVDC platform.

Moreover, connections between various components and equipment of the disclosed topside are also simplified, thereby reducing the commissioning schedule and resulting in cost savings. Connections may include, for example, electrical and fluid conduits, such as plumbing, HVAC, pipes, hoses, and the like. During fabrication of each module, e.g., the utility module and the rectifier modules, at an onshore fabrication yard, electrical and fluid conduits may be placed therein in desired locations. Once transported to the offshore jacket and moved into position, connections between fluid and electrical conduits of the utility module and the rectifier modules may be easily made via easily accessible connection points of each housing. In such a manner, a majority of conduits are already installed and merely need to be connected via the easily accessible connection points. The easily accessible connection points may be presented at a location adjacent a connection point of a neighboring module, thereby reducing the distance for routing a connecting member therebetween. The relatively shorter connecting members are easy for operators to manage and inexpensive to install.

While the foregoing is directed to embodiments of the present disclosure, other and further embodiments of the disclosure may be devised without departing from the basic scope thereof, and the scope thereof is determined by the claims that follow.

What is claimed is:

1. An offshore platform for power generation, comprising:
    a structural jacket;
    a module support frame positioned on the structural jacket;
    a utility module supported on the module support frame, the utility module disposed in a first housing, and the utility module comprising:
        a cable termination comprising a plurality of incoming power cables that provide incoming AC power and a plurality of outgoing power cables that transmit outgoing DC power,
        switchgear coupled to the plurality of incoming power cables to control a flow of the incoming AC power, and
        one or more transformers coupled to the switchgear to increase or decrease a voltage of the incoming AC power; and
    a first rectifier module supported on the module support frame adjacent to the utility module, and disposed in a second housing positioned laterally from the first housing and horizontally along the module support frame, the first rectifier module comprising equipment for converting a positive node of the incoming AC power to a first portion of the outgoing DC power;
    a second rectifier module supported on the module support frame adjacent to the utility module and disposed in a third housing positioned laterally from the first housing and horizontally along the module support frame, the second rectifier module comprising equipment for converting a negative node of the incoming AC power to a second portion of the outgoing DC power, wherein the utility module in the first housing is disposed between the first rectifier module in the second housing and the second rectifier module in the third housing.

2. The offshore platform of claim 1, wherein the equipment for converting the positive node of the incoming AC power to the first portion of the outgoing DC power comprises:
    one or more first rectifiers in a first rectifier hall; and
    one or more first reactors in a first reactor hall and coupled to the one or more first rectifiers and the plurality of outgoing power cables to supply the first portion of the outgoing DC power to the plurality of outgoing power cables.

3. The offshore platform of claim 2, wherein the first rectifier hall is positioned laterally from the first reactor hall.

4. The offshore platform of claim 1, wherein each of the first housing, the second housing, and the third housing comprises corrugated stressed steel skin.

5. The offshore platform of claim 2, wherein the first rectifier module comprises one or more sublevels, and the first rectifier hall and the first reactor hall are positioned on the same sublevel of the one or more sublevels.

6. The offshore platform of claim 5, wherein the one or more first reactors are positioned horizontally coplanar with respect to the one or more first rectifiers.

7. The offshore platform of claim 2, wherein the equipment for converting the negative node of the incoming AC power to the second portion of the outgoing DC power comprises:

one or more second rectifiers in a second rectifier hall; and
one or more second reactors in a second reactor hall and coupled to the one or more second rectifiers and the plurality of outgoing power cables to supply the second portion of the outgoing DC power to the plurality of outgoing power cables.

8. The offshore platform of claim 1, wherein each of the first rectifier module and the second rectifier module comprises a utility block, the utility block comprising a heating and cooling system and a control system for facilitating operation of the respective first or second rectifier module.

9. The offshore platform of claim 1, wherein the utility module comprises second switchgear coupled to the equipment of the first rectifier module and the equipment of the second rectifier module to direct the incoming AC power to the equipment of the first rectifier module and the equipment of the second rectifier module.

10. The offshore platform of claim 9, wherein the one or more transformers comprise a first transformer and a second transformer coupled between the switchgear and the second switchgear to increase the voltage of the incoming AC power from a first voltage in the switchgear to a second voltage in the second switchgear.

\* \* \* \* \*